United States Patent [19]

Brown

[11] 3,893,933

[45] July 8, 1975

[54] PROCESS FOR PRODUCING ENCAPSULATED TONER COMPOSITION

[75] Inventor: Robert Warren Brown, Rochester, N.Y.

[73] Assignee: Xerox Corporation, Stamford, Conn.

[22] Filed: Feb. 23, 1973

[21] Appl. No.: 335,279

[52] U.S. Cl............ 252/62.1; 117/17.5; 117/100 C; 252/316
[51] Int. Cl............................................... G03g 9/02
[58] Field of Search ..................... 252/316, 62.1 P; 117/100 C

[56] References Cited
UNITED STATES PATENTS 3,338,991  8/1967   Insalaco et al............. 117/100 A X
3,415,758  12/1968  Powell et al...................... 252/316
3,544,500  12/1970  Osmond et al.................. 252/316 X Primary Examiner—Richard D. Lovering

[57] ABSTRACT

A simplified method of encapsulating toners by polymerization and coacervation resulting in a polymer encapsulated in an incompatible shell polymer is disclosed. Toner particles are prepared by mixing a solute polymer in a solvent monomer after which polymerization of the solvent monomer is initiated resulting in a polymer from the solvent monomer which phase-separates from the solvent monomer-polymer solution to form a solvent-rich phase which eventually comprises the capsule shell. The solvent-poor phase comprises the solute polymer which provides the material for the capsule core.

5 Claims, No Drawings

PROCESS FOR PRODUCING ENCAPSULATED TONER COMPOSITION

BACKGROUND OF THE INVENTION

This invention relates to electrostatography and more particularly to improved electrostatographic developing materials and the use thereof.

In electrostatography, more specifically recited in U.S. Pat. No. 2,297,691, a uniform electrostatic charge is placed on a photoconductive insulating layer, selectively exposed, and the resulting latent electrostatic image is developed to provide a visible reproduction of an original by depositing on the image a finely divided electroscopic marking material referred to in the art as "toner". Toner is normally attracted to those areas of the layer which retain a charge thereby forming a toner image corresponding to the electrostatic latent image. The image so produced may be transferred to a support surface or otherwise processed. The image may then be permanently affixed to the support surface employing conventional fixing methods such as heating or application of a suitable solvent.

Toner alone or in combination with a suitable carrier and additives, where appropriate, may be applied employing a number of development techniques among which are cascade, more fully defined in U.S. Pat. No. 2,618,552 to E. N. Wise; magnetic brush, more fully defined in U.S. Pat. No. 2,874,063; powder cloud, more fully defined by Carlson in U.S. Pat. No. 2,221,776; or touch-down development, as disclosed by Gundlach in U.S. Pat. No. 3,166,432; among others.

When fixing the final image by application of heat, problems in adapting such a technique to high-speed machines in view of the energy required to raise the temperature of the toner to the desired level, charring or combustion, and specifically adapting toner materials to these parameters for use in high-speed electrostatographic copying machines has resulted in the requirement for additional complex machinery and process techniques. The development of an appropriate toner material which will fuse under high-speed machine conditions and avoid blocking or caking, process readily and exhibit the appropriate triboelectric properties under changes in the ambient humidity has become a rather critical and demanding art in and of itself. Other characteristics and properties that must be controlled or eliminated in a desirable toner include the effects of impaction on the triboelectric properties, the abrasive nature of the toner, and bead sticking which is the adherence of carrier beads to a reusable photoconductor surface.

Toner particles are usually comprised of thermoplastic resins selected to have melting points significantly above any ambient temperatures that might be encountered during electrostatic deposition. In addition to the developing powder or toner materials described in U.S. Pat. No. 2,297,691, a number of additional toner materials have been developed especially for use in the newer development techniques including the cascade development technique described above. Generally speaking, these new toner materials have comprised various improved resins mixed with different pigments such as carbon black and other colorants. Some examplary patents along this line include U.S. Pat. No. 2,659,670 to Copley which describes a toner resin as rosin modified phenyl formaldehyde, U.S. Pat. No. Reissue 25,136 to Carlson which describes an electrostatographic toner employing a resin of polymerized styrene and U.S. Pat. No. 3,079,342 to Insalaco describing a plasticized copolymer resin in which the comonomers are styrene and a methacrylate selected from the group consisting of butyl, iso-butyl, ethyl, propyl, and iso-propyl.

Generally these toners have been prepared by thoroughly mixing a heat softened resin and a colorant to form a uniform dispersion as by blending these ingredients in a rubber mill or the like and then pulverizing this material after cooling to form it into small particles. These toners, though they result in excellent image reproduction, do exhibit some disadvantages such as a rather wide range of particle sizes and the ability of the colored resin to be sufficiently pliable for high-speed pulverizing which results in an even wider range of particle sizes during pulverization. Other requirements of electrostatographic developers or toners including the requirements that they be stable in storage, non-agglomerative, have the proper triboelectric properties for developing and have a low melting point for heat fusing are only compounded by the additional requirements imposed by this toner forming process. It is, therefore, found that some developer materials, such as those containing toner particles made from low molecular weight resins though possessing desirable properties such as proper triboelectric characteristics, are unsuitable because they tend to cake, bridge, and agglomerate during handling and storage.

Electrostatographic developer materials which are pressure fixable have been considered in view of the above stated difficulties. However, it is found that the toner requirements for good machine performance tend to be diametrically opposed to the requirements for pressure fixing. That is, low toner impaction requires a high toner softening temperature and good mechanical strength while pressure fixing requires softening and viscous flow at room temperature. In addition, one of the problems with potential pressure fixable toners is the need to gently handle these materials prior to pressure fusion to paper or other suitable support medium so that these materials will not prefuse and cause impaction in the development chamber. Therefore, a balance must generally be made between a material which will pressure fix onto paper at low pressure but not yet impact in the development chamber. A major cause of such prefusion is the abrasive action of the tumbling carrier beads on the toner both in normal cascade development and magnetic brush development.

Electrostatographic toner materials which are capable of pressure fixing are desirable and advantageous since unencapsulated materials which undergo cold flow tend to form tacky images on the copy sheet which often offset to other adjacent sheets. Toner particles containing unencapsulated materials which undergo cold flow, tend to bridge, cake, and block during production and in the shipping container as well as in the electrostatographic imaging machine. Of course, the toner material should be capable of accepting a charge of the correct polarity such as when brought into rubbing contact with the surface of carrier materials in cascade, magnetic brush, or touch-down development systems. Further, it is found that some toner materials which possess many properties as aforementioned which would ordinarily be desirable in electrostatographic toners dispense poorly and cannot be used in automatic copying and duplicating machines. Still other toners dispense well but form images which are characterized by low density, poor resolution, or high background. Still other toners are unsuitable for processes where electrostatic transfer is employed.

Encapsulated toner materials have been provided by liquid phase separation from aqueous media, commonly called coacervation, more fully described in U.S. Pat. No. 2,800,457 and 2,800,458 to Green. However, these toner materials such as those comprising encapsulated inks are found to be generally fragile, their shells are loose after fixing and tend to cause smearing of the developed image. In addition, these materials generally have poor electrostatographic properties since the encapsulated contents tend to diffuse through the shell material leading to alteration of the triboelectric properties. Further, broken liquid core materials adversely affect copy quality due to vertical and lateral bleeding resulting in poor resolution. In U.S. Pat. Nos. 3,080,250 and 3,386,222 capsules containing solvents which tackify some portion of the toner and help to fix the image are disclosed. However, these materials comprise encapsulated liquids and once the capsule is crushed, the contents will flow perceptively with little or no applied stress and undesirable vapors are usually present.

Other techniques of toner production are known including spray drying toner from a dyed resin solution as described in U.S. Pat. No. 2,357,809 to Carlson, but these particles tend to bleed dye and to be unstable under the influences of light, heat, and/or handling. Other spray drying techniques such as that disclosed in U.S. Pat. No. 3,338,991 to Insalaco require multistep processes which are time consuming, requiring several handling procedures and containers, and requiring the use of different solvents.

Microencapsulation or in situ polymerization techniques by dispersion polymerizing a monomer to produce the wall around a pre-formed core are associated with other problems such as inhibition of polymerization of the wall monomer and the formation of solid coreless wall polymer particles.

There is, therefore, a demonstrated need for the development of improved encapsulated toner materials.

It is, therefore, an object of this invention to provide a toner material which is devoid of the above noted deficiencies.

Another object of this invention is to provide a toner which is stable at toner fusing conditions and high-speed copying in duplicating machines.

Still another object of this invention is to provide an impaction resistant toner material.

Yet another object of this invention is to provide an encapsulated toner material which is readily processed.

Again, another object of this invention is to provide a toner material which is resistant to smearing, agglomeration, and may be fused readily with less heat energy.

Yet still another object of this invention is to provide a toner which reduces mechanical abrasion of electrostatic imaging surfaces and is effective at low initial electrostatic surface potentials to provide dense toner images.

Again, another object of this invention is to provide a toner which may be fused at higher rates with less pressure.

Yet still another object of this invention is to provide an encapsulated toner containing a core material which will flow perceptively only under significant applied stress and have sufficient cohesive strength to form a good bond between the capsule shell and an image substrate.

Yet again another object of this invention is to provide a simple and effective method of producing encapsulated toner materials having physical and chemical properties superior to those of known toners and developers.

These and other objects of the instant invention are obtained, generally speaking, by providing a simplified method of encapsulating toners by polymerization and coacervation resulting in a polmer encapsulated in an incompatible shell polymer. Thus, toner particles are prepared by mixing a solute polymer in a solvent monomer after which polymerization of the solvent monomer is initiated resulting in a polymer from the solvent monomer which phase separates from the solvent monomerpolymer solution to form a solvent-rich phase which eventually comprises the capsule shell. The solvent-poor phase which comprises the solute polymer then provides the material for the capsule core.

The dispersion polymerization of the solvent monomer to form the capsule wall and its subsequent encapsulation of the solute polymer which comprises the core material is effected by employing two incompatible polymers with the polymer from the monomer solution phase separating from its monomer solution to form the solvent-rich phase and eventually the capsule wall. When coacervation occurs in such a system, the solvent-rich phase forms the shell material; the solvent-poor phase is found to deposit as the core material.

The selection of the specific monomer which eventually provides the core wall and the polymer which eventually provides the core is governed by a number of conditions among which are solubility parameters. Definition of the core wall and total capsule properties will generally limit the polymer/polymer combinations so that the polymerized monomer forms a core wall and the originally employed polymer forms the core of the encapsulated toner. In order to achieve this situation the following must be true of polymer A, the originally employed polymer; monomer B, the monomer employed; and polymer B, the polymer resulting from polymerization of monomer B: (1) polymer A must be incompatible with polymer B; (2) polymer A must be soluble in monomer B; (3) polymer B must be soluble in monomer B; and (4) polymer B will phase separate as a solvent-rich phase which eventually forms the core wall.

Encapsulation is accomplished during the heterogeneous liquid-phase polymerization wherein a polymer A is dissolved in a monomer B and the materials are chosen such that polymer A and polymer B are incompatible and phase-separate during the polymerization with polymer A forming a solvent-poor phase, and polymer B forming a solvent-rich phase. Upon completion of the process, polymer A coalesces as the capsule core, and polymer B deposits around polymer A forming the capsule wall. Colorants are normally dispersed in the starting monomer solution so that color encapsulated toner materials result. Polymerization is performed employing conventional suspension and dispersion polymerization techniques which are well known in the art in either an aqueous or non-aqueous liquid which comprises the continuous phase.

Any suitable polymer may be employed in the process of the instant invention which eventually forms the capsule core of the encapsulated toners of the instant invention. These polymers may be semisolid or liquid. Typical polymers include: olefin polymers, halo-olefin polymers, aliphatic vinyl and vinylidene polymers, such as poly (vinyl alcohol), poly (vinyl aldals), poly (vinyl ketals), vinyl ester polymers vinyl and vinylidene halide polymers, vinyl ether polymers, poly (vinyl ketones); aromatic vinyl polymers, such as polystyrene, polyindene, and polyacenaphthalene; heterocyclic vinyl polymers, such as poly (N-vinylcarbazole), poly (N-vinylpyrrolidone), and poly (vinylpyridine); acrylic and methacrylic polymers, such as poly (acrylic acid), polyacrylates, polymethacrylates, polycrotonates, polyacrylonitriles, polyacrylamides, polymethacrylamides, polyacrolein, and poly (diacryls); polyethers, such as aldehyde polymers, dialdehyde polymers, ketone and ketene polymers, aromatic polyethers, 1,2-epoxide polymers, and higher cyclic ether polymers; polysulfides and polysulfones; aliphatic and aromatic polyesters; aliphatic and aromatic polyamides; polyureas; polyurethans; natural and modified natural polymers; and combinations of the above.

Any suitable monomer may be employed in the system of the instant invention to form the capsule wall of the encapsulated toners of the instant invention. Monomers which form polymers that are insoluble in their monomers should be excluded, for example polyvinyl chloride, polyvinylidene chloride, polyacrylonitrile, and others should be avoided. Typical monomers include: acrylic acid and esters thereof; methacrylic acid and esters thereof, acrylonitrile, vinyl and vinylidene halides, vinyl esters, vinyl ethers, styrene and substituted styrenes, and combinations of the foregoing among others. Of these diene monomers are preferred since polydienes can be subsequently cross-linked to strengthen the capsule wall.

Any suitable initiator may be used in the system of the present invention. Oil-soluble initiators are normally employed although water-soluble initiators may be used. The initiator employed is generally dissolved in the monomer phase. These initiators which are widely known include compounds such as organic peroxides, organic hydroperoxides, N-nitrosoacylanilides, triphenylmethylazobenzene, and aliphatic azobisnitriles.

As before mentioned, the continuous phase of the polymerization system most commonly employed is water but organic liquids may also be employed as taught in U.S. Pat. No. 3,218,302. The continuous phase generally contains a suspending or granulating agent which agents are well known in the prior art and include compounds such as polyvinyl alcohol, polymethacrylamide, polyacrylic acid, and tricalcium phosphate for use in aqueous continuous phases; and compounds such as alkyl methacrylates, vinyl alkyl ethers, vinyl alkanoates, and alkyl vinyl sulfides, and most especially the copolymers of the above containing 1–30% of certain nitrogen containing mono ethylenically unsaturated monomers the copolymers of which have average molecular weights of $1 \times 10^6$ as taught in U.S. Pat. No. 3,218,302 where the continuous phase comprises organic liquids.

Any suitable oil-soluble surfactants which aid the dispersion of the colorant in the system of the instant invention may be employed. Typical oil soluble surfactants include: bis (trialkyl) esters of sodium sulfosuccinic acid, nonyl phenyl polyethoxy ethanol, alkylated poly vinyl pyrrolidone, phosphate monoglyceride, alkanolamides, sorbitan esters, and the like. These surfactants are generally employed to provide the desired results in a concentration of from about 0.1 to about 50 weight percent of the colorant.

Any suitable pigment may be employed in the system of the present invention. These pigments may be dispersed in the monomer with the addition of the aforementioned surfactants. Organic dyes, soluble in the monomer or polymer, may also be incorporated provided they do not alter the action of the initiator. Care should therefore be taken to eliminate incorporating free aryl, amine and phenolic groups in the dye-stuff which may retard polymerization in a deleterious manner. Typical dispersed dyes include nitro-acetamine dyes such as Yellow 2 RZ - C.I. Disperse Yellow 1, azo dyes such as C.I. Disperse Orange 3, Disperse Red 1, C.I. Disperse Black 9, C.I. Blacks 18, 19, 16, 1, 7, 12, 24, and 27, anthraquinones such as C.I. Disperse Violet Celanthrene Red, C.I. Disperse Blue 9, diazo dyes such as C.I. Food Black 1 and amino ketone dyes such as C.I. Disperse Green 1.

Suitable pigments for use in the present invention include, for example, carbon blacks, Algol Yellow, Pigment Yellow 6, Benzidine Yellow, Vulcan Fast Yellow GR, Indofast Orange, Ortho Nitroaniline Orange, Vulcan Fast Orange GG, Irgazine Red, Paranitraniline Red, Toluidine Red, Permanent Carmine FB, Permanent Bordeaux FRR, Romanesta Red, Pigment Orange R, Vulcan Fast Rubine BF, Lake Red D, Lithol Red 2G, Double Ponceau R, Calamine Red MB, Pigment Scarlet 3B, Acid Alizarine Red B, Rhodamine 6G, Rhodamine B Lake, Methyl Violet B Lake, Gentian Violet Lake, Quinizarin, Victoria Pure Blue BO Lake, Ethylviolet Lake, Phthalocyanine Blue B Pr, Pigment Blue BCS, Peacock Blue Lake, Brilliant Green B, and the like.

Concentrations of components, i.e. the granulating agent or suspending agent, the continuous phase, the dispersed phase, polymer A, monomer B, colorant, initiator, and colorant dispersing agent may generally be employed in any suitable amount as is utilized in conventional polymerization techniques where applicable. For example, the granulating agent in the continuous phase may have a concentration of from 0.0001 to 10% based on the weight of the continuous phase and preferably 0.05 to 5% based on the weight of the continuous phase. The ratios of the continuous phase and the dispersed phase may vary from 1:1 to 15:1, respectively; and are preferred to be normally from 2:1 to 8:1, respectively. The ratios of polymer A to monomer B may vary from 5:1 to 1:99, respectively or preferably from 1:1 to 1:10, respectively. Although the amount of colorant employed may vary according to whether a dye or a pigment is employed, generally 3–20% pigment by weight of the toner material is employed while substantially smaller quantities are employed if the dye colorant is utilized. The polymerization initiator may be employed in a range from 0.1 to 10% by weight of the monomer depending on the specific initiator employed and the wall properties desired. Adequate dispersion of the colorant is normally achieved when from about 0.1 to 50% dispersing aid based on the weight of the colorant is employed.

DESCRIPTION OF THE PREFERRED EMBODIMENTS

To further define the specifics of the present invention, the following examples are intended to illustrate and not limit the particulars of the present system. Parts and percentages are by weight unless otherwise indicated.

EXAMPLE I

A solution of 27 grams polyvinyl alcohol and 900 ml of distilled water is prepared and placed in a 2 liter reaction flask provided with rellux condensor and under constant argon sparge. About 60 grams of polybutyl methacrylate and 2 grams of a bis-(tridecyl) ester of sodium sulfosuccinic acid are dissolved in about 140 grams of styrene monomer. 1.4 grams of azo-bis-isobutyronitrile are dissolved in the monomer solution. 20 grams of Molacco-H carbon black which has been vacuum dried at 100°C for about 1 hour are dispersed in the monomer using a Waring blender equipped with polytron attachment until the mixture thickens in approximately 10 minutes. The monomer phase is dispersed in the aqueous phase at 1,000 RPM for 10 minutes using a simple paddle stirrer. The temperature is raised to 60°C and maintained by means of a large water bath while at the same time the stirring rate is decreased to 300 RPM. The polymerization is continued for about 6 hours after which the temperature is lowered to 25°C. The material is recovered by filtration, washed with water, and dried. The dried powder exhibits a stick-point of about 100°C on the hot bench indicating encapsulation of the poly(n-butylmethacrylate) by the polystyrene. The particle sizes obtained range from 2 to 20 microns. The term "stick-point" as employed in the examples defines the temperature at which a material adheres to a metallic substrate. For example, a continuous line of sample is equilibrated on a Koffler hot bench for about 2 hours and then gently brushed away. The stick-point is the lowest temperature at which the sample "sticks" to the metallic plate of the hot bench. The material so obtained is applied in a conventional cascade development mode to a photoconductive member which has been charged and selectively exposed thereby rendering the member visible. The developed image is then pressure fixed resulting in a clear, accurate reproduction of the image copy.

EXAMPLE II

A solution is prepared of 9 grams sodium polyacrylate and 900 ml distilled water and placed in a 1 liter reaction flask under a constant argon sparge. About 100 grams of polyvinyl acetate is dissolved in 100 grams of methylmethacrylate monomer. The monomer solution is divided into 2 portions with about 1/3 being used to dissolve 0.3 grams of benzoylperoxide. 20 grams of Molacco-H carbon black which has been vacuum dried for about 1 hour at 100°C are dispersed in the remaining monomer solution employing a Waring blender equipped with a polytron attachment for about 10 minutes. The 2 monomer portions are recombined by stirring in the Waring blender equipped with polytron for a few minutes. The monomer phase is then dispersed in the aqueous phase at 1200 RPM for about 30 minutes using a multiblade vane type stirrer. The reaction kettle is placed under 10 PSIG argon pressure to prevent refluxing of the monomer and the temperature is raised to 70°C and maintained by means of a large water bath. The stirring rate is at this time decreased to 200 RPM. The polymerization is continued for about 3 hours at which time the temperature is decreased to 25°C. The material is recovered by filtration, washed with water, and dried. The dry powder obtained exhibits a stick-point of about 100°C indicating encapsulation of the polyvinyl acetate by the polymethylmethacrylate. The material so obtained is then employed as in Example I in an electrophotographic imaging process as a developer with similar results obtained.

EXAMPLE III

A solution is prepared of 27 grams polyvinyl alcohol and 900 ml of distilled water and is placed in a 2 liter reaction flask provided with reflux condensor under constant argon sparge. About 80 grams of polyhexamethylene sebacate and 4.8 grams of azo-bis-isobutyronitrile are dissolved in about 120 grams styrene monomer. The monomer phase is dispersed in the aqueous phase at 800 RPM for about 15 minutes employing a simple paddle stirrer. The temperature is raised to about 80°C and maintained by means of a large water bath, the stirring is then decreased to about 300 RPM. The polymerization is continued for about 5 hours after which time the temperature is lowered to about 25°C. The material is recovered by filtration, water washed, and dried. The dry powder exhibits a stick-point of 100°C on a Koffler hot bench indicating encapsulation of the polyhexamethylene sebacate by the polystyrene. This material is employed as in Example I in an electrophotographic process with similar results obtained.

Although the present examples were specific in terms of conditions and materials used, any of the above listed typical materials may be substituted when suitable in the above examples with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. A process for producing encapsulated toners comprising dissolving a polymer A in a monomer whose polymer B is incompatible with polymer A to form a solution, said polymer B being soluble in its own monomer, dispersing said solution in a continuous phase, polymerizing said monomer resulting in polymer B phase separating as the solvent-rich phase to provide a wall for a core which comprises polymer A.

2. The process as defined in claim 1 wherein said polymer A is selected from the group consisting of olefin polymers, halo-olefin polymers, aliphatic vinyl and vinylidene polymers, aromatic vinyl polymers, heterocyclic vinyl polymers, acrylic and methacrylic polymers, polyethers, polysulfides and polysulfones, aliphatic and aromatic polyamides, polyureas, polyurethans, natural and modified natural polymers, and combinations thereof.

3. The process as defined in claim 1 wherein said monomer is selected from the group consisting of acrylic acid and esters thereof, methacrylic acid and esters thereof, acrylonitrile, vinyl and vinylidene halides, vinyl esters, vinyl ethers, styrene and substituted styrenes, and combinations thereof.

4. The process as defined in claim 1 wherein a polymerization initiator is employed, said initiator being selected from the group consisting of organic peroxides, organic hydroperoxides, N-nitroacylanilides, triphenylmethylazobenzene, and aliphatic azobis-nitriles.

5. The process as defined in claim 1 wherein a colorant is provided in the monomer solution.

* * * * *